United States Patent
Yasunaga

(10) Patent No.: US 9,256,775 B1
(45) Date of Patent: Feb. 9, 2016

(54) IMAGE RECOGNITION APPARATUS AND COMMODITY INFORMATION PROCESSING APPARATUS

(71) Applicant: TOSHIBA TEC KABUSHIKI KAISHA, Tokyo (JP)

(72) Inventor: Masaaki Yasunaga, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/581,497

(22) Filed: Dec. 23, 2014

(51) Int. Cl.
*G06K 7/10* (2006.01)
*G06K 9/18* (2006.01)
*G06K 7/14* (2006.01)

(52) U.S. Cl.
CPC ............ *G06K 7/1443* (2013.01); *G06K 7/1447* (2013.01)

(58) Field of Classification Search
None
See application file for complete search history.

(56) References Cited

U.S. PATENT DOCUMENTS

| 2010/0158310 A1* | 6/2010 | McQueen et al. ............ 382/100 |
| 2010/0320273 A1 | 12/2010 | Iizaka et al. |
| 2014/0168478 A1* | 6/2014 | Baheti et al. ............. 348/240.99 |

FOREIGN PATENT DOCUMENTS

JP 2009-289286 A 12/2009

* cited by examiner

*Primary Examiner* — Thien M Le
*Assistant Examiner* — Asifa Habib
(74) *Attorney, Agent, or Firm* — Patterson & Sheridan, LLP

(57) ABSTRACT

According to one embodiment, an image recognition apparatus includes an acquisition unit, an operation unit and a controller. The controller specifies a pattern area including the pattern from the image acquired by the acquisition unit, sets a pattern candidate area based on a position of a pattern area which failed to be specified, the position being accepted by the operation unit, re-sets a photography parameter for photographing the set pattern candidate area, acquires, through the acquisition unit, an image including the pattern candidate area photographed in accordance with the re-set photography parameter, specifies a pattern area from the acquired image including the pattern candidate area, and recognizes a pattern which the specified pattern area includes.

8 Claims, 10 Drawing Sheets

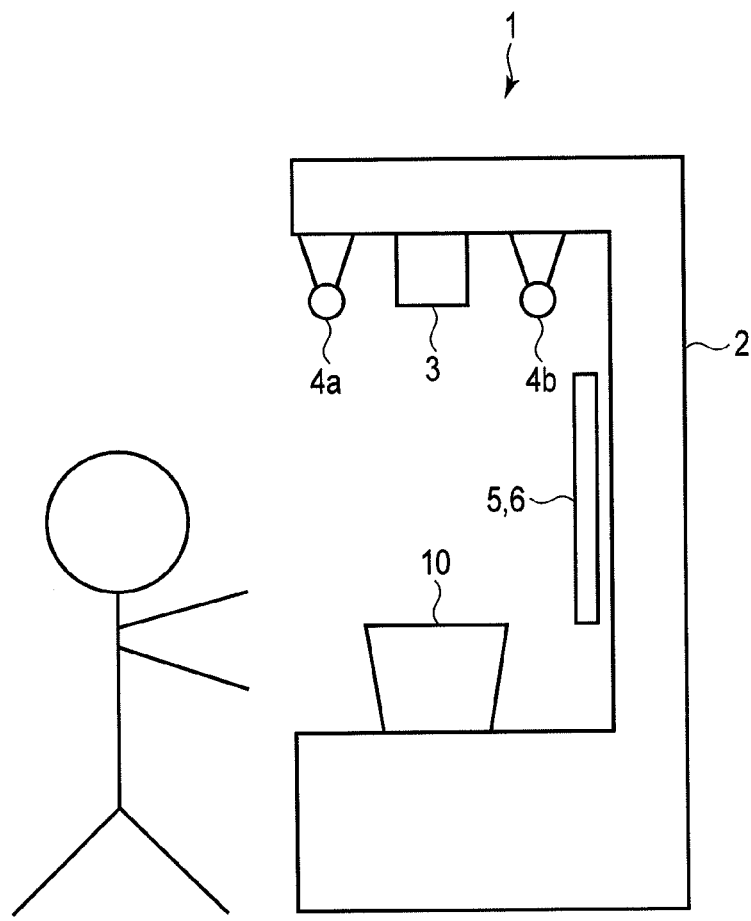
F I G. 1

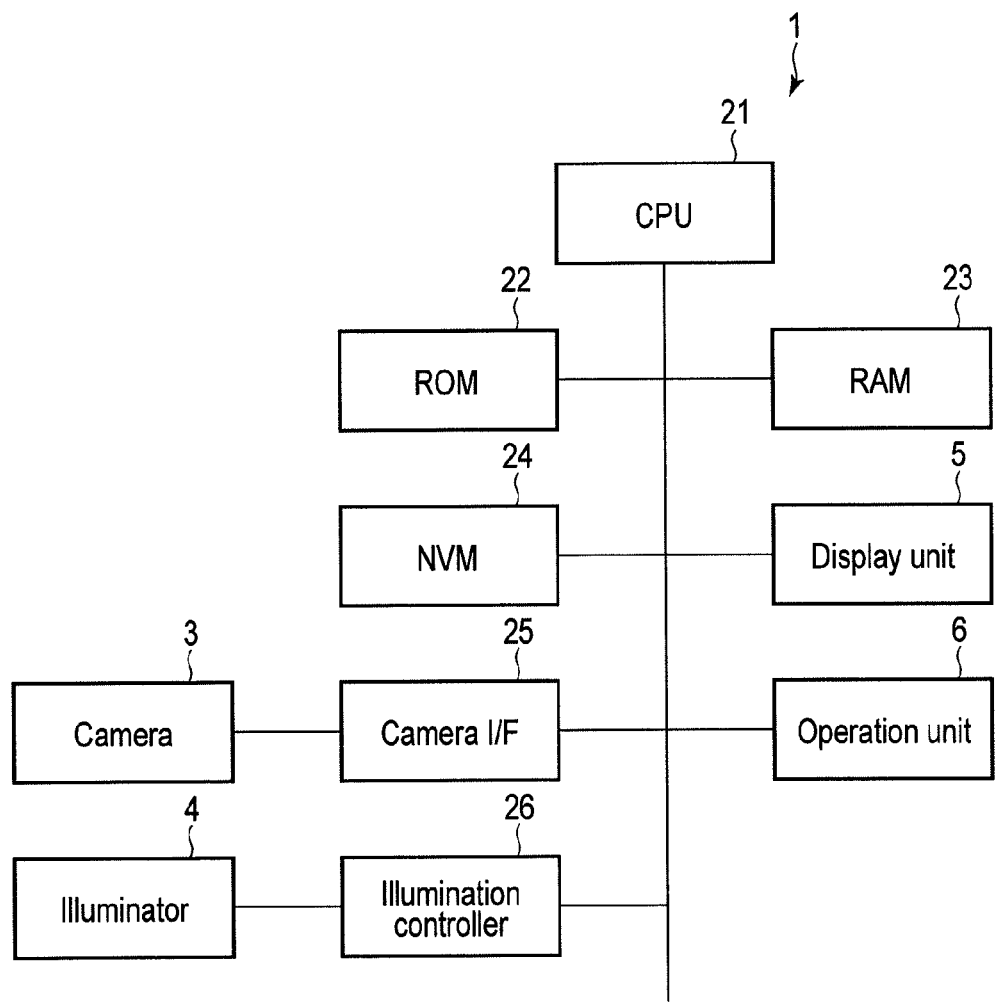
F I G. 2

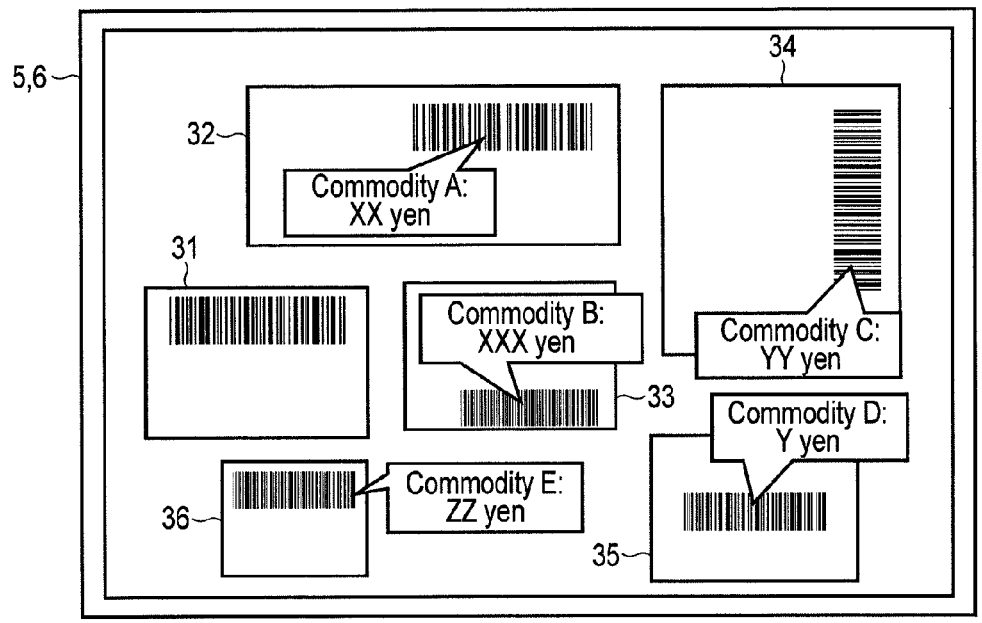
F I G. 3
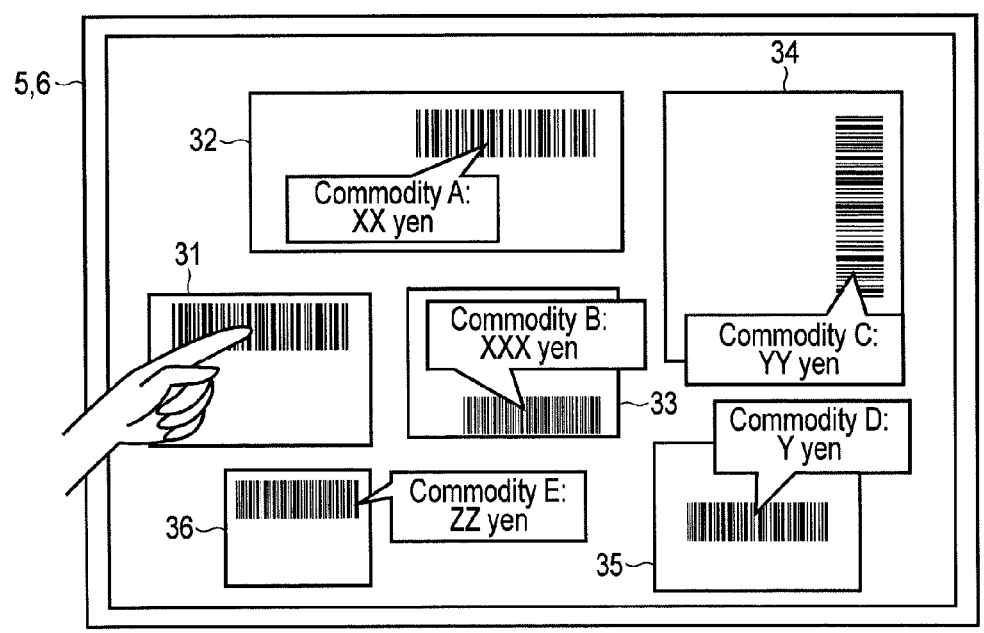
F I G. 4

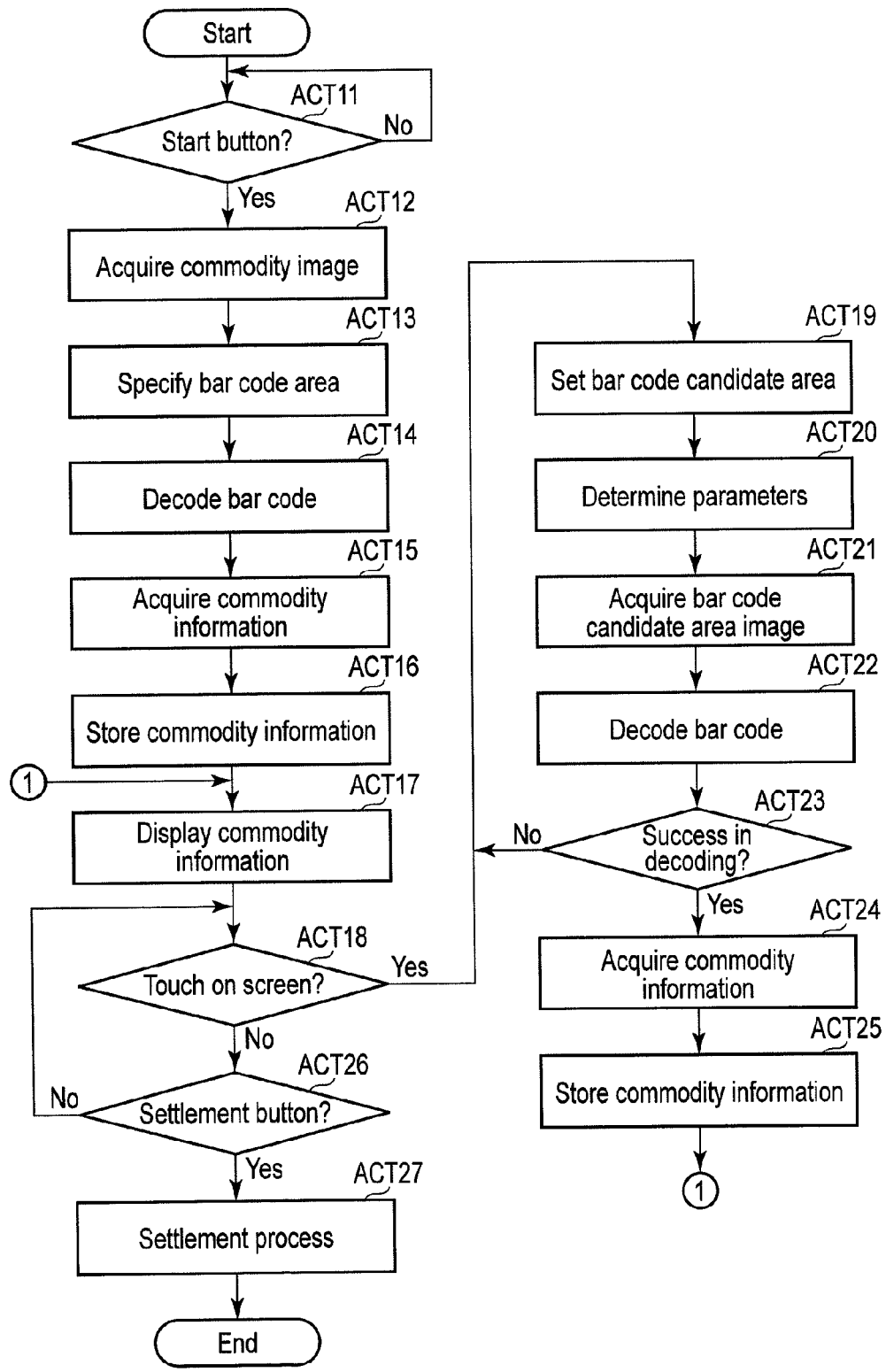
F I G. 5

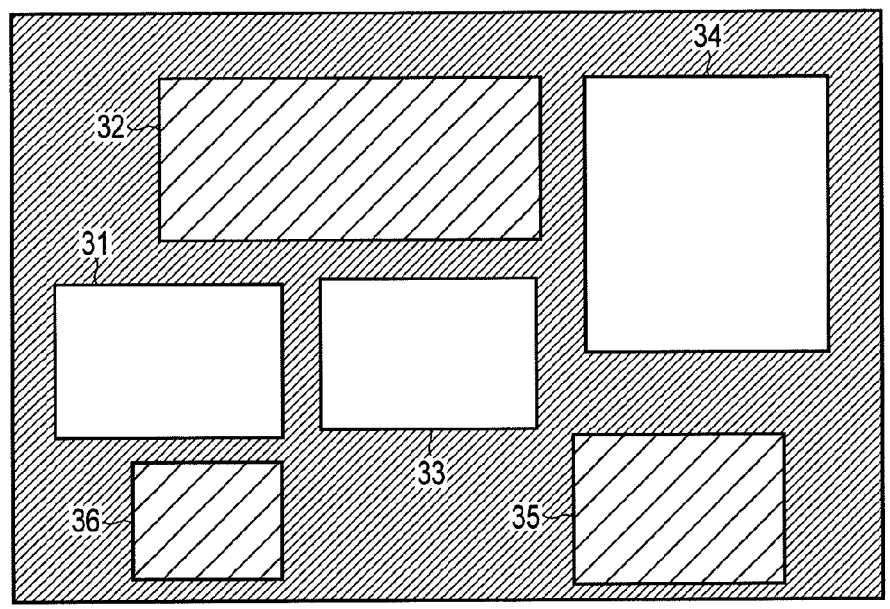
F I G. 8
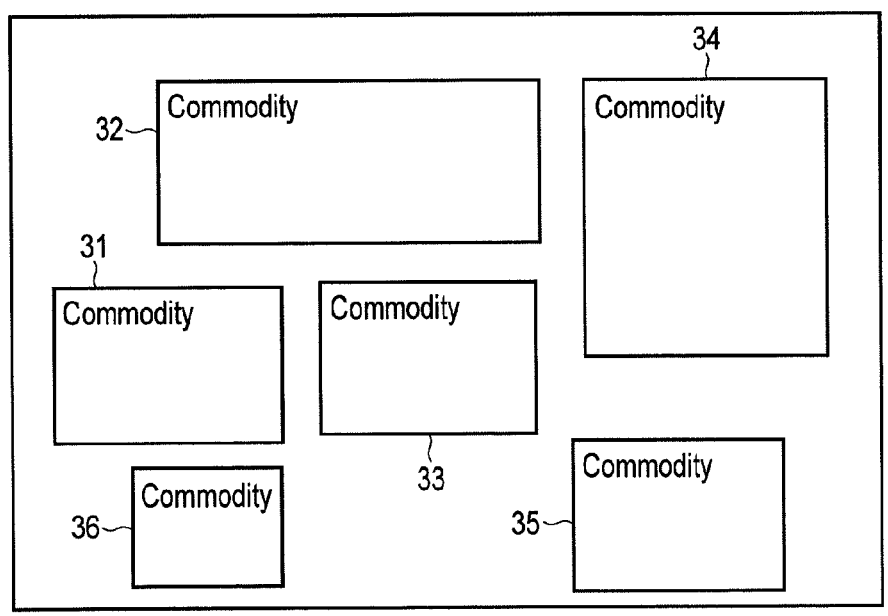
F I G. 9

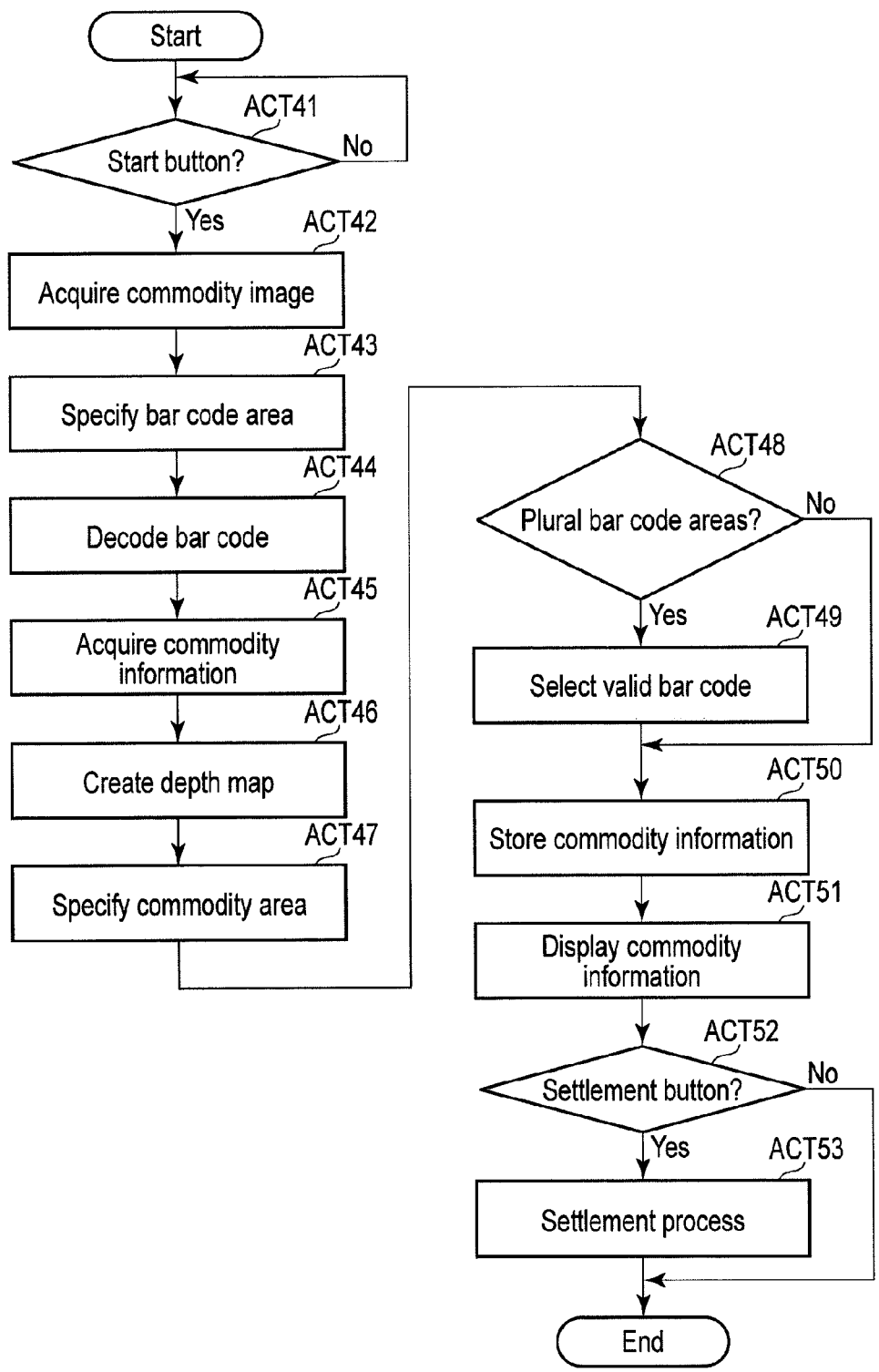
F I G. 10

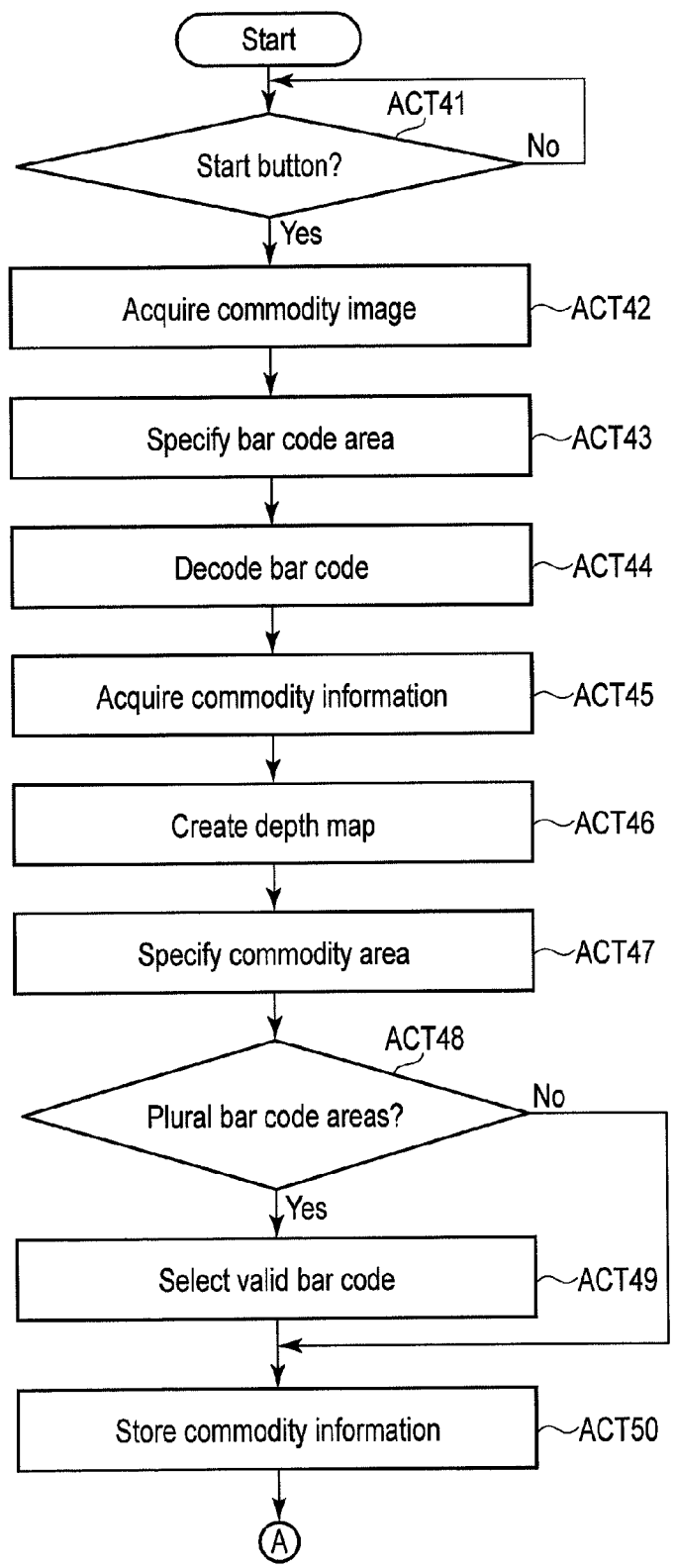
F I G. 11

IMAGE RECOGNITION APPARATUS AND COMMODITY INFORMATION PROCESSING APPARATUS

FIELD

Embodiments described herein relate generally to an image recognition apparatus and a commodity information processing apparatus.

BACKGROUND

In an image recognition apparatus which recognizes a commodity from an image photographed by a camera, the precision of recognition of the commodity varies depending on the environment of photography. For example, in the case of a POS system which recognizes a bar code of a commodity by using a camera, the precision of recognition of the bar code of the commodity varies depending on the environment of photography.

OBJECT OF INVENTION

In order to solve the above problem, there are provided an image recognition apparatus and a commodity information processing apparatus, which can properly recognize a target object.

BRIEF DESCRIPTION OF THE DRAWINGS

FIG. 1 is a view which schematically illustrates a structure example of a commodity information processing apparatus according to a first embodiment.

FIG. 2 is a block diagram illustrating a structure example of the commodity information processing apparatus of the first embodiment.

FIG. 3 is a view illustrating an example of a recognition result which the commodity information processing apparatus of the first embodiment displays.

FIG. 4 is a view illustrating an example of a touch operation in the commodity information processing apparatus of the first embodiment.

FIG. 5 is a flowchart illustrating an operation example of the commodity information processing apparatus of the first embodiment.

FIG. 8 is a view illustrating an example of a depth map according to the third embodiment.

FIG. 9 is a view illustrating an example of a labeling process result according to the third embodiment.

FIG. 10 is a flowchart illustrating an operation example of the commodity information processing apparatus of the third embodiment.

FIG. 11 is a flowchart illustrating an operation example of a commodity information processing apparatus according to a fourth embodiment.

DETAILED DESCRIPTION

Figure 6:
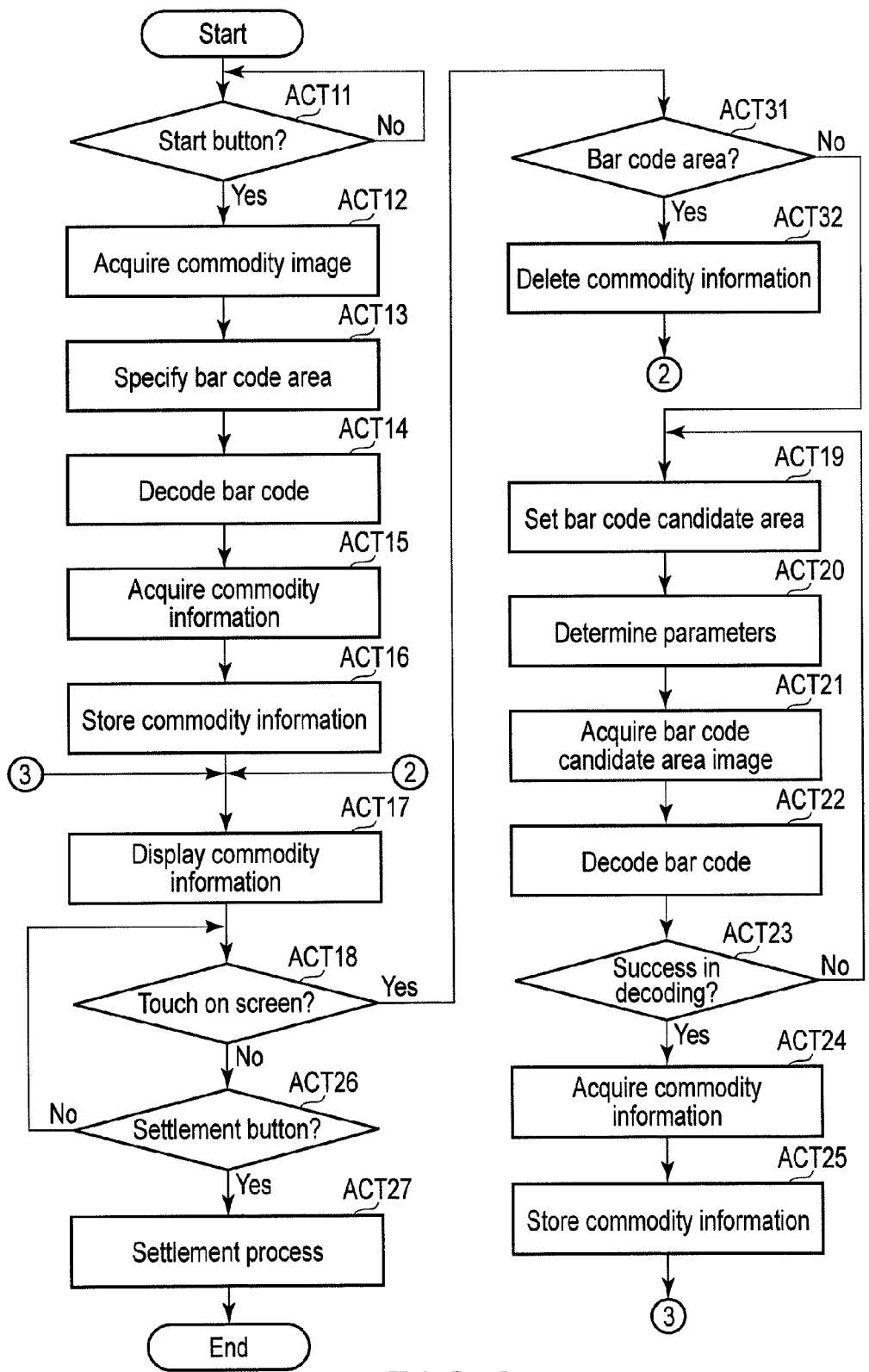
FIG. 6 is a flowchart illustrating an operation example of a commodity information processing apparatus according to a second embodiment.

In general, according to one embodiment, an image recognition apparatus includes an acquisition unit, an operation unit and a controller. The acquisition unit acquires an image which captures by photography a pattern indicative of an object. The operation unit accepts an operation of designating a position on the image acquired by the acquisition unit. The controller specifies a pattern area including the pattern from the image acquired by the acquisition unit, sets a pattern candidate area based on a position of a pattern area which failed to be specified, the position being accepted by the operation unit, re-sets a photography parameter for photographing the set pattern candidate area, acquires, through the acquisition unit, an image including the pattern candidate area photographed in accordance with the re-set photography parameter, specifies a pattern area from the acquired image including the pattern candidate area, and recognizes a pattern which the specified pattern area includes.

Various embodiments will be described hereinafter with reference to the accompanying drawings.

First Embodiment

To begin with, a commodity information processing apparatus (image recognition apparatus) according to a first embodiment is described.

FIG. 1 schematically illustrates a structure example of a commodity information processing apparatus 1 according to the first embodiment.

The commodity information processing apparatus 1 executes a settlement process with respect to a commodity in a basket 10. The commodity information processing apparatus 1 is installed, for example, in a store which sells goods. When the basket 10 is disposed at a predetermined position, the commodity information processing apparatus 1 executes a settlement process with respect to a commodity in the basket 10. The commodity information processing apparatus 1 may be installed as a self-checkout system by which a user performs a settlement process by himself/herself. In addition, the commodity information processing apparatus 1 may be installed as an ordinary cash register by which a salesclerk of the store performs a settlement process.

The commodity information processing apparatus 1 recognizes a commodity, based on a pattern which identifies the commodity (object). A commodity in the basket 10 includes a pattern which identifies the commodity. The pattern which identifies the commodity is, for instance, a bar code, a QR code, a character, a numeral, or a mark. The commodity information processing apparatus 1 may also recognize the commodity by object recognition (recognition of the pattern of the commodity itself). In this example, it is assumed that the pattern which identifies the commodity is a bar code.

As illustrated in FIG. 1, the commodity information processing apparatus 1 includes a housing 2, a camera 3, illuminators. 4a and 4b, a display unit 5, and an operation unit 6.

The housing 2 is a frame which forms the outer shape of the commodity information processing apparatus 1. The housing 2 is formed such that the basket 10 can be disposed. In the example illustrated in FIG. 1, the housing 2 has a square bracket (1) shape, and is formed such that the basket 10 can be placed.

In addition, the housing 2 stores therein a controller such as a CPU.

The camera 3 (corresponding to a photography unit) photographs a commodity in the basket 10. In the example illustrated in FIG. 1, the camera 3 is disposed in a manner to photograph the basket 10 from above. The camera 3 may be disposed in a manner to photograph the inside of the basket 10 obliquely from above. The position and direction for disposition of the camera 3 are not restricted to a specific configuration.

Incidentally, the commodity information processing apparatus 1 may include a plurality of cameras 3. In this case, the plural cameras 3 may be disposed in a manner to photograph the commodity in the basket 10 at different positions and angles.

The camera 3 is, for instance, a CCD camera. In addition, the camera 3 may a camera which is configured to photograph invisible light. The structure of the camera 3 is not restricted to a specific structure.

The illuminators 4a and 4b illuminate the pattern of the commodity in the basket 10. Based on the control from the controller in the housing 2, for example, the illuminators 4a and 4b illuminate the pattern of the commodity in the basket 10 so that the camera 3 can properly photograph the pattern of the commodity in the basket 10.

The illuminators 4a and 4b may be configured to be able to vary the illuminance or wavelength. The illuminators 4a and 4b may be configured to radiate invisible light such as infrared. In addition, the illuminators 4a and 4b may be configured to be able to vary the positions or angles. Either of, or both of, the illuminators 4a and 4b may be turned on.

Besides, the illuminators 4a and 4b may be disposed at mutually different positions or angles.

Furthermore, the commodity information processing apparatus 1 may include one illuminator 4, or three or more illuminators 4. The number of illuminators 4 included in the commodity information processing apparatus 1 is not limited to a specific number.

For example, the illuminators 4a and 4b are incandescent lamps, fluorescent lamps, or LEDs. The structures of the illuminators 4a and 4b are not restricted to specific structures.

The display unit 5 is a display device which displays various information by the control of the controller. The display unit 5 is, for example, a liquid crystal monitor.

The user of the commodity information processing apparatus 1 inputs various operational instructions to the operation unit 6. The operation unit 6 sends the data of the operational instructions, which are input by the operator, to the controller. The operation unit 6 is, for instance, a keyboard, numeral keys, and a touch panel. In addition, the operation unit 6 may accept an input of a gesture from the user.

Further, the operation unit 6 accepts an operation of designating a position on an image which the display unit 5 displays. For example, the operation unit 6 acquires a position touched on the display unit 5.

In this example, it is assumed that the operation unit 6 is a touch panel and is formed integral with the display unit 5.

Incidentally, the camera 3, illuminators 4a and 4b, display unit 5, or operation unit 6 may be formed integral with the housing 2.

In addition, where necessary, the commodity information processing apparatus 1 may include some other structure, or may not include the above-described structure.

Next, a structure example of the commodity information processing apparatus 1 is described.

FIG. 2 is a block diagram illustrating a structure example of the commodity information processing apparatus 1.

As illustrated in FIG. 2, the commodity information processing apparatus 1 includes the camera 3, illuminator 4, display unit 5, operation unit 6, a CPU 21, a ROM 22, a RAM 23, an NVM 24, a camera interface 25, and an illumination controller 26.

The camera 3, illuminator 4, display unit 5 and operation unit 6 are as described above.

The CPU 21 is a controller which executes overall control of the commodity information processing apparatus 1. The CPU 21 executes various processes, based on control programs or control data stored in the ROM 22 or NVM 24. For example, by executing the programs stored in the ROM 22, the CPU 21 executes operation control of the commodity information processing apparatus 1, or various processes corresponding to operation modes of the commodity information processing apparatus 1.

A part of various functions may be realized by a hardware circuit. In this case, the CPU 21 controls the function which is executed by the hardware circuit.

The ROM 22 is a nonvolatile memory which prestores programs for control, and control data. The ROM 22 is built in the commodity information processing apparatus 1 in the state in which the ROM 22 stores the control programs and control data at a stage of manufacture. Specifically, the control programs and control data, which are stored in the ROM 22, are pre-installed in accordance with the specifications of the commodity information processing apparatus 1.

The RAM 23 is a volatile memory. The RAM 23 temporarily stores, e.g. data which is being processed by the CPU 21. The RAM 23 stores various application programs, based on instructions from the CPU 21. In addition, the RAM 23 may store data necessary for the execution of the application programs, and execution results of the application programs.

The NVM 24 is composed of, for example, a nonvolatile memory which is capable of data write and data rewrite, such as an EEPROM or a flash ROM. The NVM 24 stores control programs, applications and various data in accordance with purposes of operational use of the commodity information processing apparatus 1. For example, in the NVM 24, program files and data files are created. Control programs and various data are written in the respective created files.

The camera interface 25 is an interface through which the CPU 21 communicates with the camera 3. The CPU 21 sets camera parameters for photography in the camera 3 through the camera interface 25. The camera parameter is, for instance, an in-focus distance, an iris, a gain, or an exposure time. In addition, when the camera 3 can vary the angle or position, the camera parameters may include the angle or position of the camera 3. In addition, when a plurality of cameras 3 are provided, the camera parameters may include information for selecting the camera 3 that is to be used for photography. The structure of camera parameters, which are set by the CPU 21, is not restricted to a specific structure.

The camera interface 25 (corresponding to an acquisition unit) acquires an image which is photographed by the camera 3. Specifically, the CPU 21 acquires the image photographed by the camera 3, through the camera interface 25.

Based on a signal from the CPU 21, the illumination controller 26 sets illumination parameters of the illuminator 4. For example, the illumination parameter is brightness of the illuminator 4. When the illuminator 4 is configured to be able to vary the wavelength, the illumination parameters may include the wavelength of the illuminator 4. When the illuminator 4 is configured to be able to vary the position or angle, the illumination parameters may include the position or angle.

The illumination parameters may include selection information which indicates which illuminator 4 is to be turned on. The selection information may be information indicating that either the illuminator 4a or 4b is to be turned on, or information indicating that both of the illuminators 4a and 4b are to be turned on.

The structure of illumination parameters, which the illumination controller 26 sets, is not restricted to a specific structure.

Incidentally, the illumination controller 26 may be realized as a function of the CPU 21. For example, the CPU 21 may realize the illumination controller 26 by executing a predetermined application.

Next, the functions which the CPU 21 realizes are described.

To begin with, the CPU 21 includes a function of acquiring a commodity image (recognition image) including a bar code (pattern) which designates a commodity in the basket 10. The commodity image includes the bar code (pattern) for identifying the commodity. For example, the CPU 21 photographs the commodity in the basket 10 by using the camera 3, and acquires the commodity image. In order to photograph the commodity image, the CPU 21 may determine photography parameters. The photography parameters are parameters which are set in order to photograph the bar code of the commodity. For example, the photography parameters include a camera parameter or/and an illumination parameter. The photography parameters may include other elements. The structure of the photography parameters is not restricted to a specific structure.

For example, the CPU 21 may set a proper camera parameter in the camera 3 through the camera interface 25. For example, the CPU 21 may determine a proper camera parameter, based on a histogram. Incidentally, the CPU 21 may set a predetermined camera parameter in the camera 3.

In addition, the CPU 21 may set a proper illumination parameter in the illuminator 4 through the illumination controller 26. For example, the CPU 21 may determine a proper illumination parameter, based on a histogram. Incidentally, the CPU 21 may set a predetermined illumination parameter in the illuminator 4.

In the meantime, the CPU 21 may determine the camera parameter in accordance with the illumination parameter, or may determine the illumination parameter in accordance with the camera parameter.

The method of determining the camera parameter or the illumination parameter is not restricted to a specific method.

Incidentally, the CPU 21 may acquire a commodity image from an external apparatus.

In addition, the CPU 21 includes a function of specifying, from the commodity image, a bar code area (pattern area) in which the bar code (pattern) that identifies the commodity is photographed. For example, the CPU 21 executes raster scan, which uses, e.g. pattern matching, on the commodity image, and specifies the bar code area (bar code area specifying process). Incidentally, the method in which the CPU 21 specifies the bar code area is not restricted to a specific method.

Furthermore, the CPU 21 includes a function of recognizing the bar code (pattern) which the bar code area (pattern area) includes. For example, the CPU 21 decodes the bar code in the bar code area. In addition, when the pattern area includes a character string as a pattern, the CPU 21 executes, e.g. an OCR process on the pattern area, and recognizes the pattern. The method in which the CPU 21 recognizes the pattern is not restricted to a specific method.

Moreover, the CPU 21 includes a function of acquiring commodity information, based on the bar code in the bar code area. For example, the CPU 21 acquires a commodity code by decoding the bar code. The CPU 21 acquires commodity information corresponding to the commodity code decoded from the bar code.

For example, the NVM 24 may store a commodity table which associates commodity codes and commodity information, and the CPU 21 may acquire commodity information by referring to the commodity table. In addition, an upper-level apparatus of the commodity information processing apparatus 1 may store a commodity table, and the CPU 21 may acquire commodity information corresponding to the commodity code from the upper-level apparatus through, e.g. a communication unit.

The commodity information includes a commodity name and a price. The structure of the commodity information is not restricted to a specific structure.

Besides, the CPU 21 includes a function of presenting the acquired commodity information to the user through the display unit 5. For example, the CPU 21 displays the commodity information by laying the commodity information over the commodity image. In addition, the CPU 21 may display the commodity information in a list form.

FIG. 3 illustrates an example of the commodity information which the CPU 21 displays through the display unit 5.

In the example illustrated in FIG. 3, the CPU 21 displays the commodity information by laying the commodity information over the commodity image. In addition, it is assumed that commodities in the basket 10 are disposed such that the bar codes face upward.

As illustrated in FIG. 3, commodities 31 to 36 are disposed in the basket 10. In this example, it is assumed that the CPU 21 specified bar code areas of the commodities 32 to 36 and acquired the commodity information, based on the bar codes in the bar code areas. In addition, in the example illustrated in FIG. 3, it is assumed that the CPU 21 failed to specify the bar code area with respect to the commodity 31.

As illustrated in FIG. 3, the display unit 5 displays the commodity information, which corresponds to the commodities 32 to 36, on areas where the commodities 32 to 36 appear. The display unit 5 displays commodity names and prices as the commodity information.

For example, "Commodity name A: XX yen" is displayed on the area where the commodity 32 appears. Specifically, the display unit 5 indicates that the commodity information of the commodity 32 is "Commodity name A: XX yen".

In addition, the CPU 21 includes a function (first operation unit) of accepting an operation of designating a bar code area which failed to be specified, from the user of the commodity information processing apparatus 1. For example, the user touches the bar code area which failed to be specified, on the operation unit 6 (touch panel), and the CPU 21 accepts the operation of designating the bar code area which failed to be specified, by specifying the position touched by the user.

FIG. 4 illustrates an example of the touch operation by the user of the commodity information processing apparatus 1.

FIG. 4 illustrates the example in which the user inputs a touch operation on the display example of commodity information shown in FIG. 3.

As illustrated in FIG. 4, the user touches a bar code area which failed to be specified (i.e. the bar code area of the commodity 31).

The CPU 21 detects the user's touch through the operation unit 6, and specifies the position of the touch.

In addition, the CPU 21 includes a function of setting a bar code candidate area (pattern candidate area), based on the position which the user touched as the bar code area. For example, the CPU 21 determines the bar code candidate area by raster-scanning the vicinity of the position touched by the user. The CPU 21 specifies the bar code candidate area according to a condition which is relaxed, compared to a condition for specifying the bar code area by the bar code area specifying process. For example, the CPU 21 specifies the bar code candidate area by using a threshold value which is relaxed, compared to a threshold value for identifying the bar code area. The method in which the CPU 21 specifies the bar code candidate area is not restricted to a specific method.

In addition, the CPU 21 includes a function of re-setting photography parameters for photographing a bar code candidate area. For example, the CPU 21 determines a camera parameter or/and an illumination parameter as photography parameters for properly photographing the bar code candidate area.

For example, if the CPU 21 determines, based on a histogram or the like, that halation (blown-out highlights) occurs in a bar code candidate area, the CPU 21 determines, as an illumination parameter, selection information which indicates that a part or all of the illuminators 4 are to be turned on or turned off. For example, the CPU 21 determines to turn off direct light on the bar code candidate area in the illuminators 4. In addition, the CPU 21 determines to turn off direct light and to turn on indirect light in the illuminators 4.

Besides, the CPU 21 may set, as the illumination parameter, the position or/and direction of the illuminators 4 so as to avoid direct light on the bar code candidate area. In addition, the CPU 21 may set, as the camera parameter, a low iris, a low gain, or/and a short exposure time.

Furthermore, if the CPU 21 determines, based on a histogram or the like, that blocked-up shadows occur in the bar code candidate area or the contrast of the bar code candidate area is low, the CPU 21 determines, as the illumination parameter, to turn on all or a part of the illuminators 4. In addition, the CPU 21 may set, as the illumination parameter, the position or/and direction of the illuminators 4 so as to brighten the bar code candidate area. Besides, the CPU 21 may set, as the illumination parameter, the position or/and direction of the illuminators 4 so as to produce direct light on the bar code candidate area. In addition, the CPU 21 may set, as the camera parameter, a high iris, a high gain, or/and a long exposure time.

In addition, for example, if the CPU 21 determines, based on a density cross section or the like, that the bar code candidate area is out of focus, the CPU 21 sets, as the camera parameter, an in-focus distance or/and an iris such that the bar code candidate area is focused.

Aside from the above case, the CPU 21 may set, as the camera parameter, the position or direction of the camera 3 so as to be able to properly photograph the bar code candidate area.

In addition, the CPU 21 includes a function of acquiring an image (bar code candidate area image) including a bar code candidate area (pattern candidate area) photographed according to the photography parameters which are determined in order to properly photograph the bar code candidate area. For example, the CPU 21 sets, through the camera interface 25, the camera parameters, which constitute the photography parameters, in the camera 3. Further, the CPU 21 sets, through the illumination controller 26, the illumination parameters, which constitute the photography parameters, in the illuminators 4. After setting the respective parameters, the CPU 21 photographs the bar code candidate area by using the camera 3. Incidentally, the CPU 21 may acquire the bar code candidate area image from an external apparatus.

Moreover, the CPU 21 includes a function of specifying a pattern area from the bar code candidate area image. For example, the CPU 21 specifies the pattern area by raster-scanning the bar code candidate area. Since this function is the same as the function of specifying the pattern area from the commodity image, a detailed description is omitted.

Furthermore, the CPU 21 includes a function of executing a settlement process, based on the acquired commodity information. For example, the CPU 21 calculates a settlement amount, based on the commodity information, and accepts a settlement process from the user. For example, the CPU 21 may execute the settlement process by using a credit card, or may execute the settlement process by using cash.

Next, an operation example of the commodity information processing apparatus 1 is described.

FIG. 5 is a flowchart for describing an operation example of the commodity information processing apparatus 1.

In this example, it is assumed that the user placed commodities in the basket 10 such that the bar code areas face upward. It is also assumed that the user disposes the basket 10 at such a predetermined position that the camera 3 can photograph the commodities in the basket 10.

To start with, the CPU 21 determines whether a start button was pressed (ACT 11). The start button is a button for starting a settlement process with respect to the commodities in the basket 10. The start button may be an icon displayed on the display unit, or some other operation unit.

If the CPU 21 determines that the start button is not pressed (ACT 11, NO), the CPU 21 returns to ACT 11.

If the CPU 21 determines that the start button was pressed (ACT 11, YES), the CPU 21 photographs the inside of the basket 10 by using the camera 3, and acquires a commodity image (ACT 12).

Upon acquiring the commodity image, the CPU 21 specifies a bar code area from the acquired commodity image (ACT 13). Upon specifying the bar code area, the CPU 21 decodes a bar code in the specified bar code area (ACT 14).

Upon decoding the bar code, the CPU 21 acquires commodity information corresponding to a commodity code obtained by the decoding (ACT 15). Upon acquiring the commodity information, the CPU 21 stores the acquired commodity information in the RAM 23 as the commodity information of the commodity for which the user settles (ACT 16). Incidentally, the CPU 21 may store the acquired commodity information in the NVM 24.

Upon storing the commodity information, the CPU 21 displays the commodity information on the display unit 5 (ACT 17).

Upon displaying the commodity information, the CPU 21 determines, through the operation unit 6, whether the user touched a bar code area which failed to be specified (ACT 18).

If the CPU 21 determines that the user touched (ACT 18, YES), the CPU 21 sets a bar code candidate area, based on the position touched by the user (ACT 19). Upon setting the bar code candidate area, the CPU 21 determines photography parameters for properly photographing the bar code candidate area (ACT 20). Upon determining the photography parameters, the CPU 21 photographs the bar code candidate area by using the camera 3 in accordance with the photography parameters, and acquires a bar code candidate area image (ACT 21).

Upon acquiring the bar code candidate area image, the CPU 21 decodes the bar code in the bar code candidate area (ACT 22). If the CPU 21 determines that the decoding failed (ACT 23, NO), the CPU 21 returns to ACT 19. Incidentally, if the CPU 21 returns to ACT 19, the CPU 21 may newly acquire a commodity image and may set a bar code candidate area.

If the CPU 21 determines that the decoding was successful (ACT 23, YES), the CPU 21 acquires commodity information corresponding to the decoded commodity code (ACT 24). Upon acquiring the commodity information, the CPU 21 stores the acquired commodity information in the RAM 23 as the commodity information of the commodity for which the user settles (ACT 25).

Upon storing the commodity information, the CPU 21 goes to ACT 17.

If the CPU 21 determines that the user does not touch (ACT 18, NO), the CPU 21 determines whether the user pressed a settlement button (ACT 26). The settlement button is a button for confirming that there is no problem with the recognition of commodities. The settlement button may be an icon which the display unit 5 displays, or some other operation unit. In addition, instead of determining whether the settlement button was pressed, the CPU 21 may determine whether a predetermined operation was performed. For example, the CPU 21 may determine whether cash was put in a cash slot or the like, or whether a credit card was inserted in a card slot.

If the CPU 21 determines that the user does not press the settlement button (ACT 26, NO), the CPU 21 returns to ACT 18.

If the CPU 21 determines that the user pressed the settlement button (ACT 26, YES), the CPU 21 executes a settlement process, based on commodity information pieces stored in the RAM 23 as the commodity information corresponding to commodities for which the user settles (ACT 27).

After executing the settlement process, the CPU 21 terminates the operation.

In the meantime, when the CPU 21 failed in decoding a predetermined number of times in ACT 23, the CPU 21 may issue a notification that the CPU 21 cannot detect the bar code.

The commodity information processing apparatus with the above-described structure can set the bar code candidate area, based on the user's designation of the bar code area which failed to be recognized, even when the commodity information processing apparatus failed in recognizing the bar code area. As a result, the commodity information processing apparatus can photograph the bar code candidate area with the photography parameters which are suited to the bar code candidate area. Thus, the commodity information processing apparatus can properly recognize the bar code which failed to be recognized. In addition, the commodity information processing apparatus can recognize the bar code which failed to be recognized, without making the user touch the commodity, and can prevent wrongdoing.

Second Embodiment

Next, a second embodiment is described.

A commodity information processing apparatus 1 according to the second embodiment differs from the commodity information processing apparatus 1 of the first embodiment in that the commodity information processing apparatus 1 of the second embodiment deletes an erroneously detected bar code. Accordingly, the other points are denoted by the same reference numerals, and a detailed description is omitted.

Next, functions, which the CPU 21 realizes, are described.

The CPU 21 includes a function (corresponding to the operation unit) of accepting an operation of designating the position of an erroneously detected bar code, from the user through the operation unit 6. For example, the CPU 21 accepts an operation of specifying the position of an erroneously detected bar code area, by the erroneously detected bar code area being touched in the state in which the display unit 5 displays commodity information lying over a commodity image. Specifically, the CPU 21 recognizes that the bar code corresponding to the bar code area including the touched position was erroneously detected.

In addition, the CPU 21 includes a function of deleting an erroneously detected bar code area from recognition results. For example, the CPU 21 deletes the commodity information corresponding to the bar code in the erroneously detected bar code area, from the commodity information pieces stored in the RAM 23 as the commodity information corresponding to commodities for which the user settles.

Next, an operation example of the commodity information processing apparatus 1 of the second embodiment is described.

FIG. 6 is a flowchart for describing the operation example of the commodity information processing apparatus 1 of the second embodiment.

The operation example of the commodity information processing apparatus 1 of the second embodiment differs from the operation example of the first embodiment in that ACT 31 and ACT 32 are added. Accordingly, the other steps are denoted by the same reference numerals, and a detailed description is omitted.

If the CPU 21 determines that the user touched (ACT 18, YES), the CPU 21 determines whether the position touched by the user is within the bar code area (ACT 31). If the CPU 21 determines that the position touched by the user is within the bar code area (ACT 31, YES), the CPU 21 deletes the commodity information corresponding to the bar code in bar code area including the position touched by the user, from the commodity information pieces stored in the RAM 23 as the commodity information of commodities for which the user settles (ACT 32).

Upon deleting the commodity information, the CPU 21 returns to ACT 17.

If the CPU 21 determines that the position touched by the user is not within the bar code area (ACT 31, NO), the CPU 21 goes to ACT 19.

The commodity information processing apparatus with the above-described structure can exclude, from the objects of settlement, the commodity information corresponding to the bar code in the erroneously detected bar code area. For example, when a store sells a set of single commodities, there is a case in which the bar codes of the original single commodities are hidden and a bar code for set selling is newly added. However, in some cases, the commodity information processing apparatus erroneously detects a hidden bar code area. To be more specific, when the bar code of a single commodity is hidden by additionally writing a line on the bar code, the commodity information processing apparatus, in some cases, erroneously detects a bar code area excluding the area on which the line is additionally written. In addition, when the bar code of a single commodity is hidden by a semitransparent cellophane adhesive tape or the like, the commodity information processing apparatus, in some cases, erroneously detects a bar code area through the semitransparent cellophane adhesive tape. Even when the bar code area was erroneously detected as described above, the commodity information processing apparatus can properly execute the settlement process.

Third Embodiment

Next, a third embodiment is described.

A commodity information processing apparatus 1 according to the third embodiment differs from the commodity information processing apparatus 1 of the first embodiment in that the commodity information processing apparatus 1 of the third embodiment selects a valid bar code from among bar codes included in a plurality of bar code areas, when the commodity information processing apparatus 1 detected the plural bar code areas in one commodity area. Accordingly, the other structure is denoted by the same reference numerals, and a detailed description is omitted.

To begin with, a structure example of the commodity information processing apparatus 1 is described.

Figure 7:
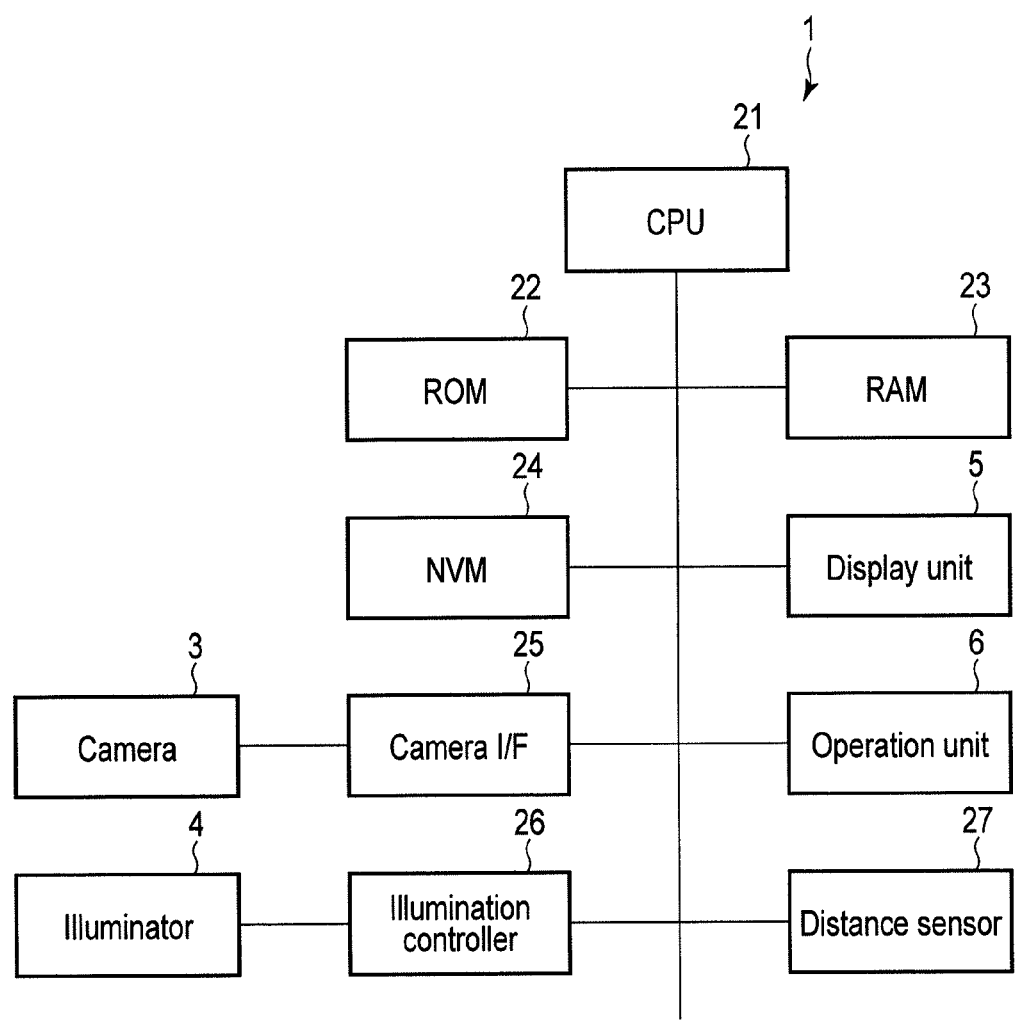
FIG. 7 is a view which schematically illustrates a structure example of a commodity information processing apparatus according to a third embodiment.

FIG. 7 is a block diagram illustrating a structure example of the commodity information processing apparatus 1.

The structure example of the commodity information processing apparatus 1 of the third embodiment differs from the structure example of the commodity information processing apparatus 1 of the first embodiment in that the commodity information processing apparatus 1 of the third embodiment includes a distance sensor 27. Accordingly, the other structure is denoted by the same reference numerals, and a detailed description is omitted.

The commodity information processing apparatus 1 further includes the distance sensor 27.

The distance sensor 27 (corresponding to a measurement unit) measures a height at each part in the basket 10. Specifically, the distance sensor 27 measures a height of a predetermined region (e.g. a region within the basket 10) including a bar code designating a commodity. For example, the distance sensor 27 measures a distance from an upper side of the basket 10. In this case, the distance sensor 27 measures the height as a large height in a region where a commodity is present, and measures the height as a small height in a region where no commodity is present.

For example, the distance sensor 27 is disposed above the basket 10 such that the distance sensor 27 faces the basket 10 in a downward direction. The distance sensor 27 is, for instance, an infrared distance-measuring sensor or a stereoscopic camera.

The structure of the distance sensor 27 is not limited to a specific structure.

Nest, the CPU 21 includes a function of specifying an area (single pattern area) including one bar code area. For example, the CPU 21 specifies a commodity area as a single pattern area.

For example, the CPU 21 creates a depth map within the basket 10 by using the distance sensor 27. The depth map is a map indicating heights of respective regions.

FIG. 8 is a view illustrating an example of the depth map which the CPU 21 creates.

In the example illustrated in FIG. 8, it is assumed that commodities 31 to 36 are placed in the basket 10. In addition, the depth map illustrated in FIG. 8 indicates that the darker the color, the smaller the height, and the lighter the color, the greater the height.

As illustrated in FIG. 8, in the depth map, the color is dark in a region where no commodity is present, and the color is light in a region where a commodity is present (i.e. a region where commodities 31 to 36 are present).

In addition, the CPU 21 specifies commodity areas, based on the depth map. For example, the CPU 21 specifies light-colored areas in the depth map as commodity areas.

FIG. 9 illustrates an example of commodity areas which the CPU 21 specified.

As illustrated in FIG. 9, the CPU 21 specifies light-colored areas in FIG. 8 as commodity areas.

Incidentally, the CPU 21 may specify commodity areas without using the distance sensor 27. For example, the CPU 21 may specify a commodity area from a difference between an image in a state in which there is no commodity and the present image.

In addition, the CPU 21 includes a function (selection unit) of selecting a valid bar code from among bar codes included in a plurality of bar code areas, when the CPU 21 specified the plural bar code areas in a single pattern area (commodity area). For example, when the CPU 21 detected, in one commodity area, both a bar code area including a bar code for set selling and bar code areas including bar code for single commodities, the CPU 21 selects the bar code for set selling as a valid bar code. Incidentally, in this case, the CPU 21 may select the bar code for set selling as the valid bar code, after confirming that the commodities indicated by the bar codes for single commodities are commodities which constitute the set indicated by the bar code for set selling.

For example, the NVM 24 may store set information indicative of commodities which constitute the set. Based on the set information stored in the NVM 24, the CPU 21 may verify that the commodities indicated by the bar codes for single commodities are commodities which constitute the set indicated by the bar code for set selling. In addition, the CPU 21 may acquire set information from an upper-level terminal of the commodity information processing apparatus 1.

Next, an operation example of the commodity information processing apparatus 1 is described.

FIG. 10 is a flowchart for describing the operation example of the commodity information processing apparatus 1.

In this example, it is assumed that the user places commodities in the basket 10 such that the bar code areas face upward. In addition, it is assumed that the user disposes the basket 10 at such a predetermined position that the camera 3 can photograph the commodities in the basket 10.

To start with, the CPU 21 determines whether the start button was pressed (ACT 41).

If the CPU 21 determines that the start button is not pressed (ACT 41, NO), the CPU 21 returns to ACT 41.

If the CPU 21 determines that the start button was pressed (ACT 41, YES), the CPU 21 photographs the inside of the basket 10 by using the camera 3, and acquires a commodity image (ACT 42).

Upon acquiring the commodity image, the CPU 21 specifies a bar code area from the acquired commodity image (ACT 43). Upon specifying the bar code area, the CPU 21 decodes a bar code in the specified bar code area (ACT 44).

Upon decoding the bar code, the CPU 21 acquires commodity information corresponding to a commodity code obtained by the decoding (ACT 45). Upon acquiring the commodity information, the CPU 21 creates a depth map by using the distance sensor 27 (ACT 46). Upon creating the depth map, the CPU 21 specifies a commodity area (single pattern area), based on the depth map (ACT 47).

Upon specifying the commodity area, the CPU 21 determines whether a plurality bar code areas are present in one commodity area (ACT 48).

If the CPU 21 determines that a plurality bar code areas are present in one commodity area (ACT 48, YES), the CPU 21 selects a valid code from among bar codes existing in the plural bar code areas (ACT 49).

If the CPU 21 determines that a plurality bar code areas are not present in one commodity area (ACT 48, NO) or the CPU 21 selected the valid bar code (ACT 49), the CPU 21 stores the commodity information acquired in ACT 45, or commodity information corresponding to the bar code selected in ACT 49, in the RAM 23 as the commodity information of the commodity for which the user settles (ACT 50). Specifically, when the CPU 21 selected the valid bar code in ACT 49, the CPU 21 does not store the commodity information corresponding to the bar codes, which were not selected in the one commodity area, as the commodity information of the commodity for which the user settles.

Incidentally, the CPU 21 may store the commodity information in the NVM 24.

Upon storing the commodity information, the CPU 21 displays the commodity information on the display unit 5 (ACT 51).

Upon displaying the commodity information, the CPU 21 determines whether the user pressed the settlement button (ACT 52). If the CPU 21 determines that the user pressed the settlement button (ACT 52, YES), the CPU 21 executes a settlement process (ACT 53).

If the CPU 21 determines that the user does not press the settlement button (or the user pressed a settlement NG button) (ACT 52, NO), or if the CPU 21 executed the settlement process, the CPU 21 terminates the operation.

In the meantime, when the CPU 21 failed to select the valid bar code from among the plural bar codes, the CPU 21 may issue a notification that the CPU 21 failed in recognition.

The commodity information processing apparatus with the above-described structure can automatically select a valid bar code, even when the commodity information processing apparatus detected a plurality of bar code areas in one commodity area. As a result, the commodity information processing apparatus can execute the settlement process by excluding commodities corresponding to unnecessary bar codes, without involving the user's operation.

Fourth Embodiment

Next, a fourth embodiment is described.

A commodity information processing apparatus 1 according to the fourth embodiment differs from the commodity information processing apparatus 1 of the third embodiment in that the commodity information processing apparatus 1 of the fourth embodiment re-photographs a commodity area including no bar code area. Accordingly, the other structure is denoted by the same reference numerals, and a detailed description is omitted.

To begin with, functions, which the CPU 21 realizes, are described.

The CPU 21 includes a function of specifying a commodity area (non-recognition area) including no bar code area. For example, the CPU 21 specifies, as a non-recognition area, a commodity area within which the CPU 21 failed to detect any bar code area.

In addition, the CPU 21 includes a function of re-setting photography parameters for properly photographing the non-recognition area. Since this function is the same as the function of setting photography parameters for properly photographing a bar code candidate area, a detailed description is omitted.

Furthermore, the CPU 21 includes a function of acquiring an image (non-recognition area image) including the non-recognition area (single pattern area including no pattern area) photographed in accordance with the photography parameters. For example, the CPU 21 acquires a non-recognition area image by photographing the non-recognition area by using the camera 3 in accordance with the photography parameters. Incidentally, the CPU 21 may acquire the non-recognition area image from an external apparatus.

Besides, the CPU 21 includes a function of specifying a bar code area from the non-recognition area image acquired by photographing the non-recognition area. For example, the CPU 21 specifies the bar code area by executing raster-scan using pattern matching, etc.

Next, an operation example of the commodity information processing apparatus 1 is described.

Figure 12:
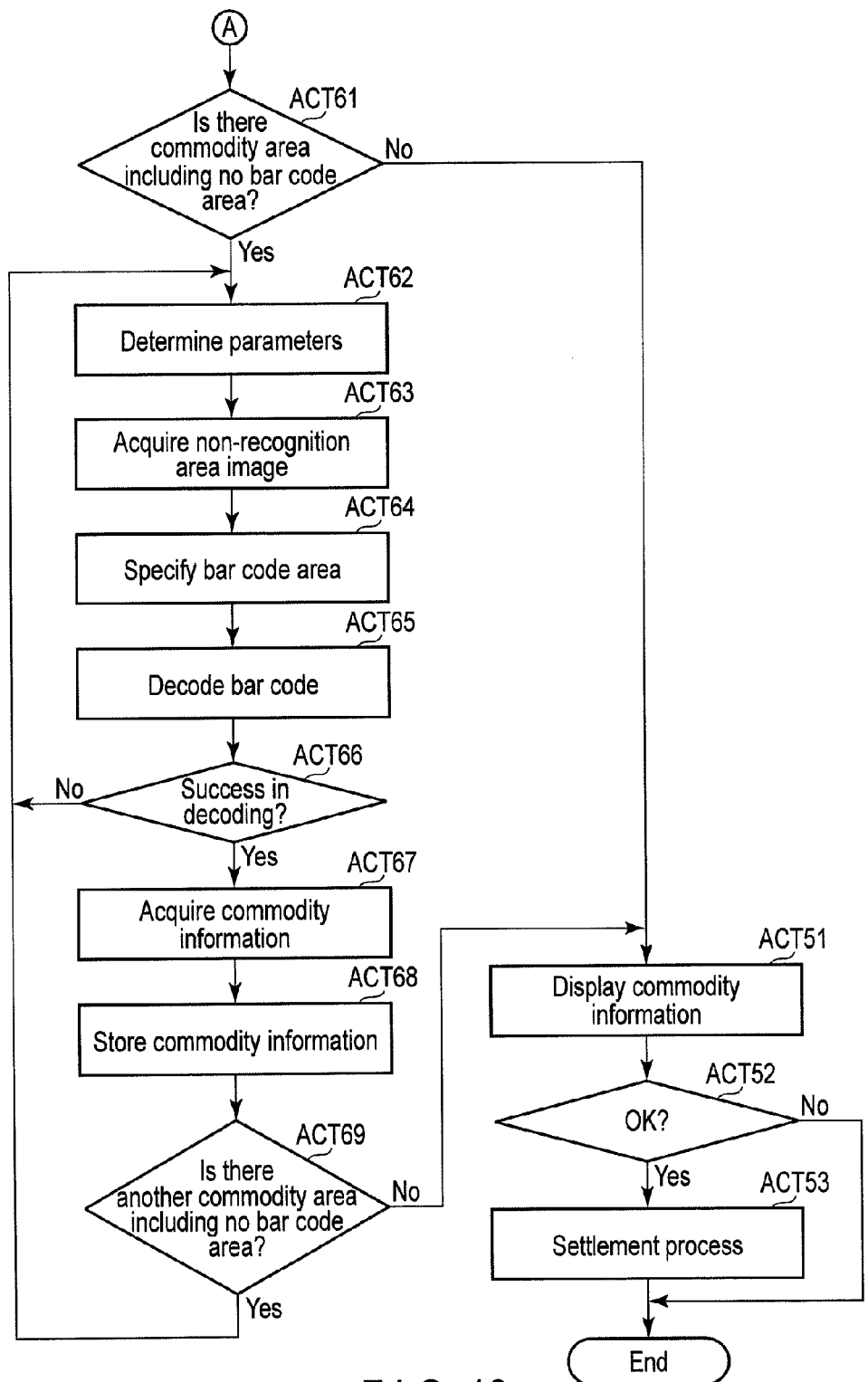
FIG. 12 is a flowchart illustrating the operation example of the commodity information processing apparatus according to the fourth embodiment.

FIG. 11 and FIG. 12 are flowcharts for describing the operation example of the commodity information processing apparatus 1.

The operation example of the commodity information processing apparatus 1 of the fourth embodiment differs from the operation example of the third embodiment in that ACT 61 and ACT 69 are added. Accordingly, the other steps are denoted by the same reference numerals, and a detailed description is omitted.

Upon storing the commodity information (ACT 50), the CPU 21 determines whether a commodity area including no bar code area is present (ACT 61). If the CPU 21 determines that a commodity area including no bar code area is present (ACT 61, YES), the CPU 21 determines photography parameters for properly photographing the non-recognition area (ACT 62).

Upon determining the photography parameters, the CPU 21 photographs the non-recognition area by using the camera 3 in accordance with the photography parameters, and acquires a non-recognition area image (ACT 63). Upon acquiring the non-recognition area image, the CPU 21 extracts a bar code area from the non-recognition area image (ACT 64).

Upon extracting the bar code area, the CPU 21 decodes the bar code in the bar code area (ACT 65). If the CPU 21 determines that the decoding failed (ACT 66, NO), the CPU 21 returns to ACT 62.

If the CPU 21 determines that the decoding was successful (ACT 66, YES), the CPU 21 acquires commodity information corresponding to the decoded commodity code (ACT 67). Upon acquiring the commodity information, the CPU 21 stores the acquired commodity information in the RAM 23 as the commodity information of the commodity for which the user settles (ACT 68).

Upon storing the commodity information, the CPU 21 determines whether another commodity area including no bar code area is present (ACT 69). If the CPU 21 determines that another commodity area including no bar code area is present (ACT 69, YES), the CPU 21 returns to ACT 62.

If the CPU 21 determines that a commodity area including no bar code area is not present (ACT 61, NO) or that another commodity area including no bar code area is not present (ACT 69, NO), the CPU 21 goes to ACT 51.

In the meantime, when the CPU 21 failed in decoding a predetermined number of times in ACT 66, the CPU 21 may issue a notification that the CPU 21 cannot detect the bar code.

The commodity information processing apparatus with the above-described structure can specify a commodity area including no bar code area, can re-photograph this commodity area, and can extract a bar code area. Thus, the commodity information processing apparatus can properly extract the bar code area, without involving the user's operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity information processing apparatus which recognizes a pattern indicative of a commodity object, comprising:
   a controller; and
   an interface configured to transfer to the controller an image captured by photography, the image including at least a first pattern indicative of a first commodity object, wherein the controller is configured to:

specify a first area in the image including the first pattern, recognize the first pattern in the image area and acquire first commodity information corresponding to the first pattern, specify, based on the acquired first commodity information, a second area in the image, the second area including the first pattern and a second pattern indicative of a plurality of first commodity objects, recognize the second pattern in the second area and acquire second commodity information corresponding to the second pattern, and execute a settlement process based on the acquired first and second commodity information.

2. The commodity information processing apparatus according to claim 1, wherein images of the plurality of first commodity objects are included in the second area.

3. The commodity information processing apparatus according to claim 1, further comprising a measurement unit configured to measure a distance from a base point to the first area, wherein the controller is configured to specify the second area based on the distance measured by the measurement unit.

4. The commodity information processing apparatus according to claim 1, wherein the controller is further configured:

to re-set at least one photography parameter for photographing the first area if no pattern is recognized in the specified first area, to acquire, through the interface, a new image photographed in accordance with the re-set photography parameter, to specify a new first area in the new image including the first pattern, and to recognize the first pattern in the new first area.

5. The commodity information processing apparatus according to claim 1, further comprising:

a camera to photograph the image, wherein the at least one photography parameter includes a camera parameter which is set in the camera.

6. The commodity information processing apparatus according to claim 1, wherein one of the first and second patterns includes any one of a barcode, a QR code, a character, a numeral, and a mark.

7. The commodity information processing apparatus according to claim 1, wherein the second area includes the first area.

8. The commodity information processing apparatus according to claim 1, wherein the second area includes a third pattern indicative of a second commodity object different from the first commodity object.

* * * * *